Dec. 20, 1960  S. J. KOPEC  2,964,977
TRANSMISSION

Filed July 12, 1956  2 Sheets-Sheet 1

INVENTOR.
STANLEY J. KOPEC
BY
*Charles L. Lovercheck*
ATTORNEY

Dec. 20, 1960 S. J. KOPEC 2,964,977
TRANSMISSION

Filed July 12, 1956 2 Sheets-Sheet 2

INVENTOR.
STANLEY J. KOPEC
BY
Charles L. Loverchick
ATTORNEY

# United States Patent Office 2,964,977
Patented Dec. 20, 1960

2,964,977
TRANSMISSION

Stanley J. Kopec, 577 Randolph St., Northville, Mich.

Filed July 12, 1956, Ser. No. 597,432

4 Claims. (Cl. 74—781)

This invention relates to transmissions and more particularly to hydraulically or electrically operated transmissions for use in automotive vehicles and the like.

The principle involved in the present invention is to provide a planetary transmission which drives through three members, namely, a sun gear, a ring gear, and a planetary gear having a selection of speed ratios, by shifting the members relative to each other and allowing one of the members to have a certain amount of slippage relative to the other members which will decrease the speed ratio of the device. An increase of speed can be had by driving two of the members and using the third as an output, either forward or reverse.

It is, accordingly, an object of this invention to provide a planetary transmission which is simple in construction, economical to manufacture, and simple and efficient in operation.

Another object of this invention is to provide a simple reversing mechanism for a planetary transmission.

A further object of the invention is to provide a planetary transmission wherein two members thereof are driven and the third member connected to a driven member.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
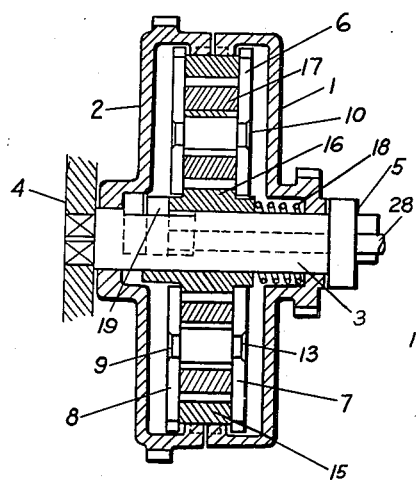
Fig. 1 is a cross sectional view taken on line 1—1 of Fig. 2.
Figure 2:
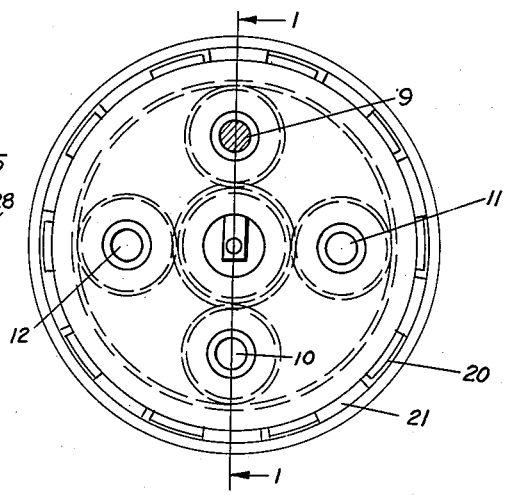
Fig. 2 is a cross sectional view of the transmission shown in Fig. 1.

Now with more specific reference to the drawings, a transmission is shown in Figs. 1 to 5 inclusive having an input member 1 and an output member 2 which are journalled on a shaft 3 having bearings 4 and 5. A planetary assembly 6 is disposed between the members 1 and 2 and is made up of two plate members, planetary carriers, or disks 7 and 8 which are held together by hubs 9, 10, 11, and 12 which are peened at 13 to hold the plates 7 and 8 in position. The hubs 9, 10, 11, and 12 form axles for planetary gears 17 which are journalled thereon. The planetary gears 17 mesh with a floating ring gear 15 at the outside and with a sun gear 16. The sun gear 16 is keyed to the shaft 3 and laterally slidable thereon by being urged in one direction by a spring 18 and movable in the other direction by a key 19 which is attached to a rod 28 disposed in a concentric bore therein. The planetary assembly 6 is shifted by exerting a pull on the rod 28.

The plates 7 and 8 have spaced peripheral notches 20 thereon and the ring gear 15 has notches 21 spaced around the periphery thereof. These notches are adapted to be engaged by claws 22 which are attached to the inner periphery of a flange 24 attached to the drive member 1 and claws 25 which are attached to an overhanging flange member 26 of the driven member 2.

Figures 3, 4, 5:
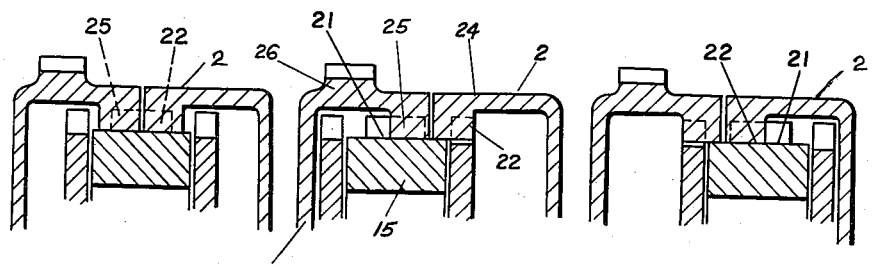
Fig. 3 is a view of the transmission having the planetary gears in an intermediate position or direct drive position.
Fig. 4 shows the planetary gears shifted so that the transmission is in overdrive.
Fig. 5 shows the gears shifted so that the transmission is in an underdrive position.

When a tension is exerted on the rod 28 to move the planetary assembly 6 to the position shown in Fig. 3, the claws 25 and 22 will engage the notches 21 on the outer periphery of the ring gear 15. This will lock the members 1 and 2 together so that they rotate in unison and there can be no relative rotation between the members 1 and 2. Therefore, the transmission will deliver a 1–1 ratio in this position. When the tension on the rod 28 is released, the spring 18 will push the planetary assembly 6 to the position shown in Fig. 4 whereat the plate 7 will engage the claws 22 and the notches 21 on the outer edge of the ring gear 15 will engage the claws 25. Therefore, the plate 7 and the gear 17 may rotate relative to each other between the member 1 and the member 2 when the sun gear 16 is held against rotation. If the sun gear 16 is allowed to slip back instead of being held and the slip is less than the output of the driven member 2, the velocity of the driven member would be of less velocity than if the sun gear 16 were held firmly.

Figure 6:
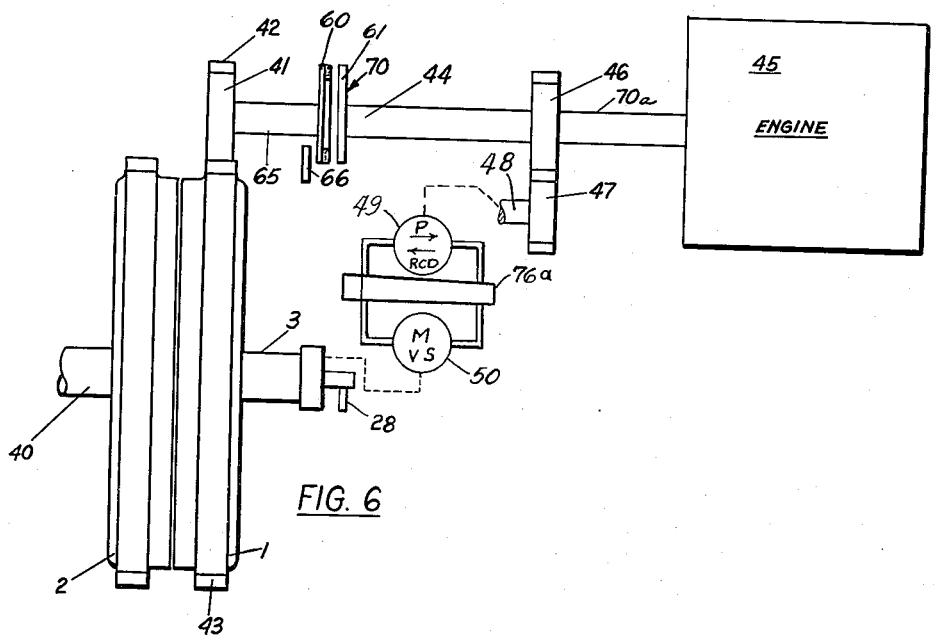
Fig. 6 is a view of the novel speed reducing arrangement connected into the planetary transmission shown in Figs. 1 to 5.

This is taken advantage of by connecting the transmission described in Figs. 1 to 5 into a drive as shown in Fig. 6. In Fig. 6, a driven shaft 40 is attached to the driven housing 2. The input member 1 has peripheral teeth 43 thereon. A gear 41 is mounted on a shaft 65 and has teeth 42 meshing with the teeth 43 on the outer periphery of the drive member 1. The gear 41 is driven through clutch plates 60 and 61 and a shaft 44 by an engine 45, the shaft 65, and a clutch 70. The shaft 44 also has a gear 46 fixed to rotate therewith which engages a gear 47. The gear 47 is attached to and rotates with a shaft 48 which in turn drives a variable delivery fluid pump 49. A variable speed fluid motor 50 drives the shaft 3.

It is well known that when the sun gear of a planetary transmission is held against rotation, a transmission such as that disclosed in Figs. 1 to 5 will give a possible speed range of three speeds forward. When either the ring gear or the planetary gears are held and the sun gear is driven, a reverse drive will result. In order to obtain the advantages of a three speed variation, a clutch and drive arrangement is provided made up of the combination clutch and brake plate 60 which can be shifted so that the plate 60 engages the clutch plate 61 which is attached to the drive shaft 65 whereby the shaft 44 will drive the shaft 65 or, when the plate 60 is shifted to disengage the plate 61, the plate 60 will engage a plate 66 which is fixed against rotation to the machine frame and it will lock the shaft 65 and, therefore, the housing 1 against rotation.

Therefore, when the rod or shaft 28 moves to bring the planetary assembly 6 to any one of the three speed positions shown in Figs. 3, 4, and 5 and the clutch plate 61 engages the plate 60 to cause a positive input therethrough, the drive member 1 will be driven through the gear 41 and the gear 46 driven by the shaft 70a will drive through the gear 47 and the shaft 48 and will drive the pump 49. The pump 49 supplies oil to drive the motor 50.

By controlling the direction of flow of liquid from the pump 49 by means of a valve cylinder 78, the speed of the shaft 40 for any position of the planetary gears can be controlled. The flow of fluid from pipes 73 and 76 from the pump 49 to pipes 75 and 72 can be controlled by changing the output from the double three-way valve actuated by manual control 76a whereby the direction of flow to pipes 72 and 75 is reversed and, therefore, the direction of rotation of the pump is reversed.

Figure 7:
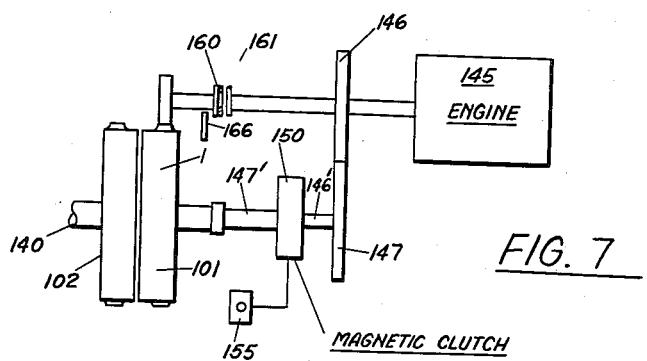
Fig. 7 is another embodiment of the invention.
Figure 8:
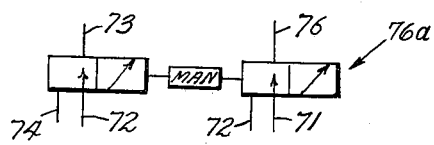
Fig. 8 shows a schematic view of the double three-way valve shown in combination with the machine in Fig. 6 shown using the Code of the Joint Industrial Conference published by the American Society of Tool Engineers, for illustration purposes, with a manual control for shifting the valve.

Fig. 7 shows a similar arrangement to that shown in Fig. 6; however, in this arrangement, a magnetic clutch 150 has been substituted. By controlling the relative slipping of the clutch 150 by means of an electrical exciting means 155 which is no more than a rheostat arrangement for controlling the flow of exciting current for the clutch 150, the relative slippage between a shaft 146' and a shaft 147' and, therefore, the speed ratio of the drive shaft to the driven shaft are controlled. A reverse gear can be provided in a similar manner by providing a clutch brake arrangement 160 similar to that described in Fig. 6.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A transmission, said transmission comprising a planetary drive, said planetary drive having a sun gear, a ring gear, and a planetary assembly including planetary gears, said planetary gears being in meshing engagement with said ring gear and said sun gear, a source of power connected to said transmission, a motor, pump means driven by said source of power, means connecting said pump means to said motor, control means connected to said means connecting said pump means to said motor to control the direction and magnitude of rotation of said motor relative to said source of power, said motor being operatively connected to said sun gear, means to connect said transmission to a load, said planetary assembly being shiftable to operatively connect said source of power to said planetary assembly to drive said means connecting said transmission to a load selectively through said ring gear to said planetary gears or through said planetary gears to said ring gear with the speed and direction of rotation of said means to connect said transmission to a load controlled by said control means.

2. The transmission recited in claim 1 wherein a clutch and brake are provided, said clutch having means for disconnecting said means connecting said source of power to said transmission and said brake having means for locking said ring gear against rotation.

3. A transmission comprising a planetary gear train having a sun gear, a ring gear, and a planetary carrier having planetary gears disposed in meshing engagement with said sun and said ring gears, an input means, an output means, a source of power connected to said input means, means to connect said sun gear to said source of power, means to control the speed and direction of rotation of said sun gear, means connecting said input means and said output means selectively to either said ring gear or to said planetary carrier, clutch means to connect said source of power to said input means or to disconnect said input means from said source of power, and brake means to selectively lock said input means when said source of power is disconnected from said input means.

4. A transmission comprising a planetary gear train having a sun gear, a ring gear, and planetary gears disposed in meshing engagement with each other, output means and input means, a source of power, a driven member, variable speed control means connecting said source of power to said sun gear to control the speed and direction of rotation thereof, clutch means for connecting and disconnecting said input means to said source of power and to selectively lock said input means against rotation, and means operatively connecting both said input and output means to said gears.

References Cited in the file of this patent

UNITED STATES PATENTS

| | | |
|---|---|---|
| 1,870,076 | Thomson | Aug. 2, 1932 |
| 2,336,912 | Zimmermann | Dec. 14, 1943 |
| 2,343,509 | Jandasek | Mar. 7, 1944 |
| 2,599,814 | Cull | June 10, 1952 |
| 2,787,173 | Bergles | Apr. 2, 1957 |
| 2,803,975 | Akerman et al. | Aug. 27, 1957 |